(12) United States Patent
Leaptrot et al.

(10) Patent No.: US 11,264,227 B2
(45) Date of Patent: Mar. 1, 2022

(54) METHODS AND SYSTEMS FOR ION MOBILITY AND MASS ANALYSIS

(71) Applicant: Vanderbilt University, Nashville, TN (US)

(72) Inventors: Katrina L. Leaptrot, Antioch, TN (US); Jody C. May, Nashville, TN (US); John A. Mclean, Nashville, TN (US)

(73) Assignee: Vanderbilt University, Nashville, TN (US)

( * ) Notice: Subject to any disclaimer, the term of this patent is extended or adjusted under 35 U.S.C. 154(b) by 0 days.

(21) Appl. No.: 16/962,744

(22) PCT Filed: Jan. 3, 2019

(86) PCT No.: PCT/US2019/012196
§ 371 (c)(1),
(2) Date: Jul. 16, 2020

(87) PCT Pub. No.: WO2019/152129
PCT Pub. Date: Aug. 8, 2019

(65) Prior Publication Data
US 2021/0090871 A1    Mar. 25, 2021

Related U.S. Application Data

(60) Provisional application No. 62/623,762, filed on Jan. 30, 2018.

(51) Int. Cl.
*H01J 49/10* (2006.01)
*H01J 49/06* (2006.01)
*H01J 49/36* (2006.01)

(52) U.S. Cl.
CPC ............ *H01J 49/10* (2013.01); *H01J 49/068* (2013.01); *H01J 49/36* (2013.01)

(58) Field of Classification Search
CPC .......... H01J 49/10; H01J 49/068; H01J 49/36; H01J 49/02; H01J 49/06
(Continued)

(56) References Cited

U.S. PATENT DOCUMENTS 3,479,487 A    11/1969  Stoll
8,835,839 B1 *  9/2014  Anderson ............... H01J 49/06
                                              250/290

(Continued)

OTHER PUBLICATIONS

International Search Report and Written Opinion for Application No. PCT/US2019/012196 dated Mar. 22, 2019 (7 pages).

*Primary Examiner* — Michael Maskell
(74) *Attorney, Agent, or Firm* — Michael Best & Friedrich LLP

(57) ABSTRACT

An ion manipulation device and systems and methods for controlling the ion manipulation device. The ion manipulation device includes a pair of counter-facing surfaces and a plurality of electrodes arranged in one or more linear array on each of the counter-facing surfaces. At least one RF power source is coupled to the electrodes and configured to apply an RF potential to the electrodes to create an electric field that inhibits charged particles from approaching the counter-facing surfaces. At least one DC power source is coupled to the electrodes and configured to apply a DC potential to affect the movement of ions between the counter-facing surfaces in a direction parallel to the counter-facing surfaces. The DC potential and the RF potential are applied to the electrodes simultaneously.

21 Claims, 13 Drawing Sheets

(58) Field of Classification Search
USPC .................................. 250/281, 282, 288, 292
See application file for complete search history.

(56) References Cited

U.S. PATENT DOCUMENTS

| | | |
|---|---|---|
| 8,901,490 B1 | 12/2014 | Chen et al. |
| 8,907,273 B1 | 12/2014 | Chen et al. |
| 8,969,800 B1 | 3/2015 | Tolmachev et al. |
| 9,111,741 B2 * | 8/2015 | Ding .................... H01J 49/004 |
| 9,812,311 B2 * | 11/2017 | Anderson ............. H01J 49/062 |
| 2004/0026611 A1 * | 2/2004 | Bateman ............. H01J 49/4235 |
| | | 250/281 |
| 2017/0076931 A1 | 3/2017 | Ibrahim et al. |
| 2017/0125229 A1 | 5/2017 | Giles et al. |

* cited by examiner

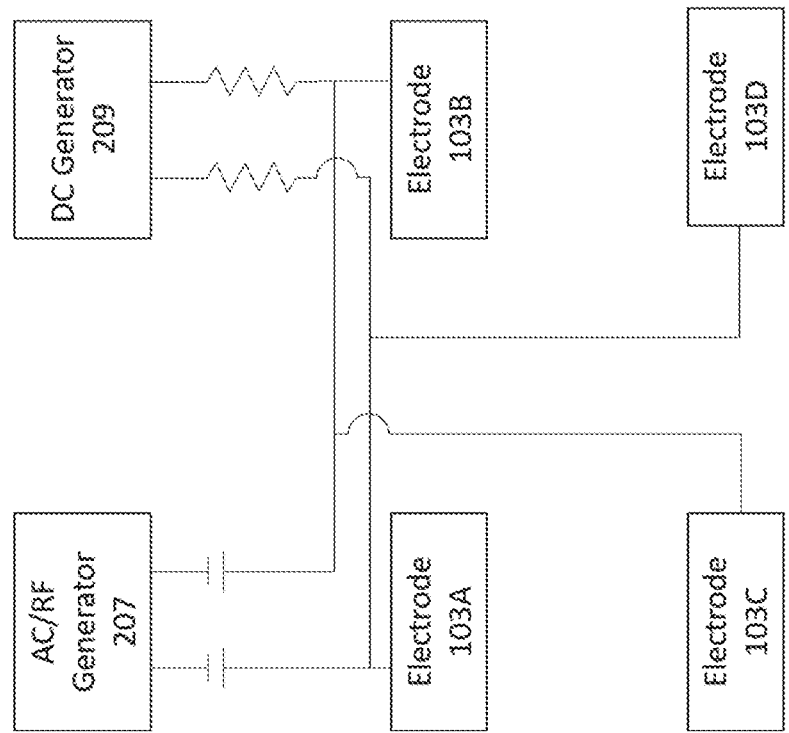
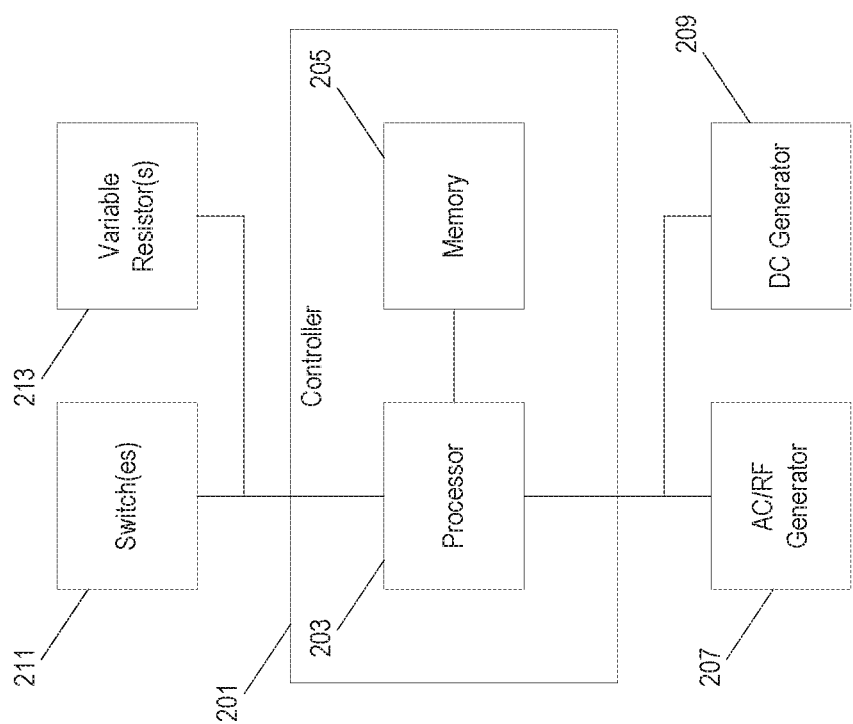
FIG. 2B
FIG. 2A

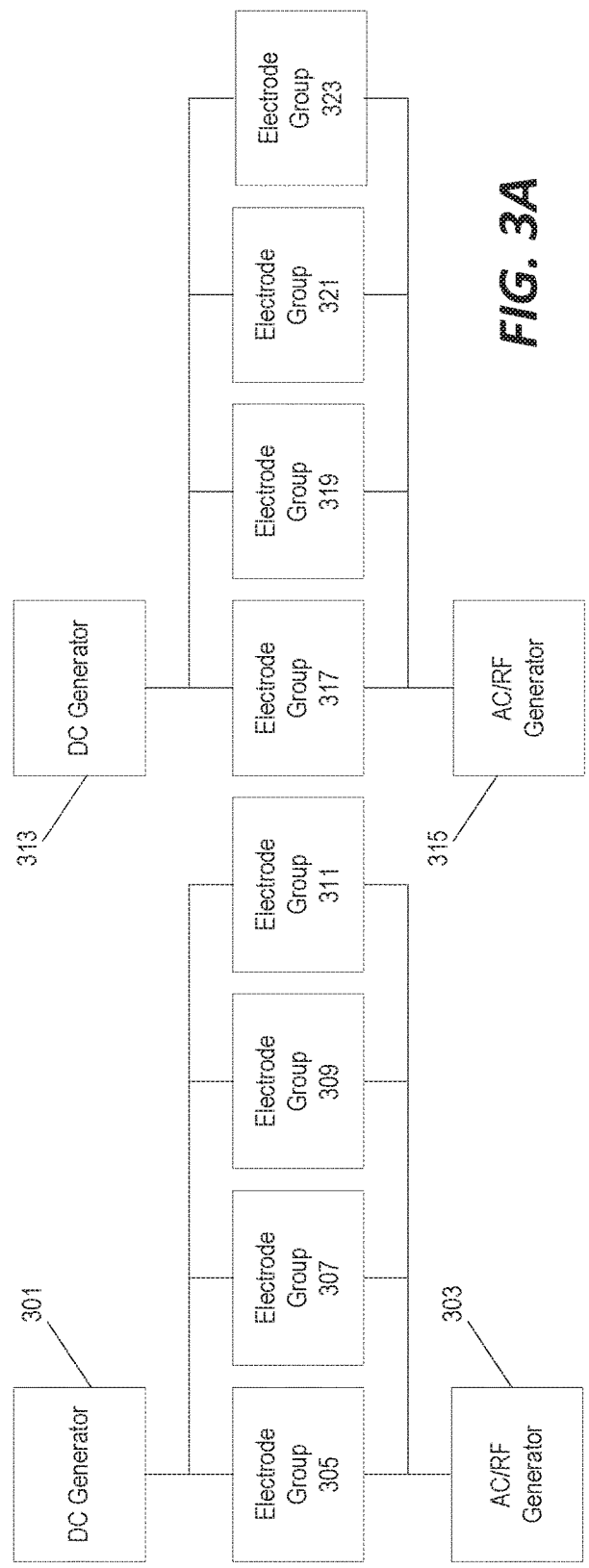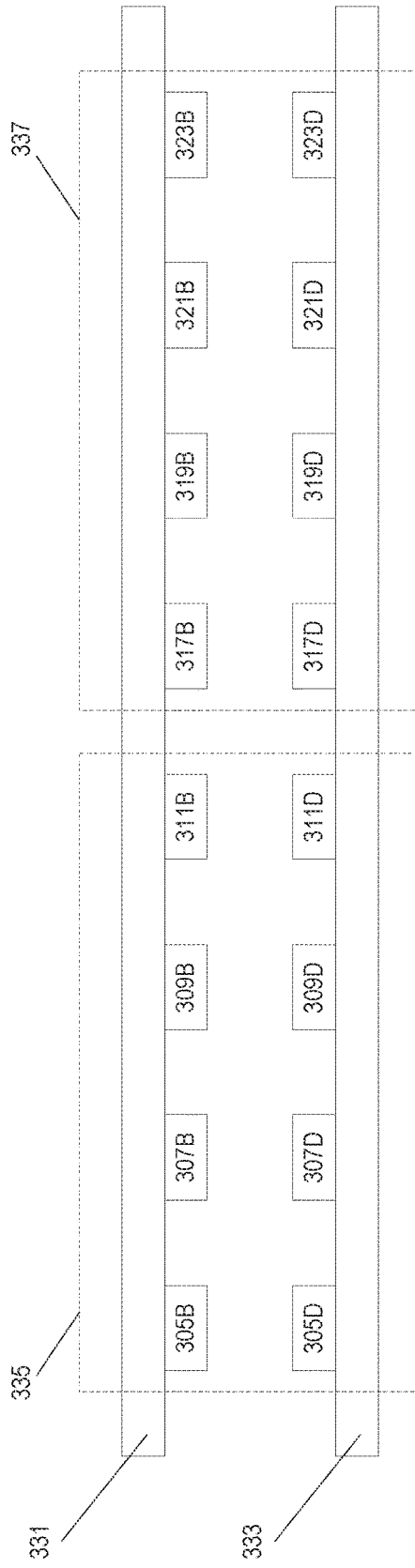

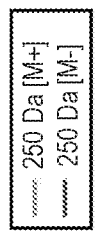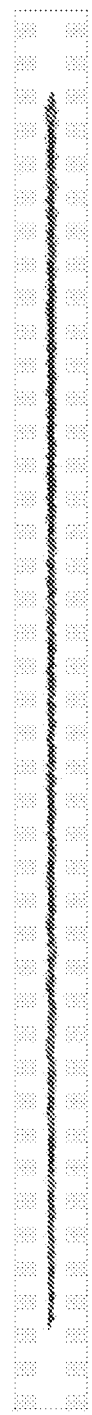
FIG. 11
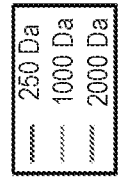
FIG. 12

METHODS AND SYSTEMS FOR ION MOBILITY AND MASS ANALYSIS

RELATED APPLICATIONS

This patent application is the U.S. national stage entry, under 35 U.S.C. §371, of International Application Number PCT/US2019/012196, filed Jan. 3, 2019, which claims the benefit of U.S. Provisional Application No. 62/623,762, filed Jan. 30, 2018, entitled "METHODS AND SYSTEMS FOR MASS ANALYSIS," the entire contents of each of which are incorporated herein by reference.

BACKGROUND

The present invention relates to systems and methods for ion mobility and mass analysis.

SUMMARY

In some implementations, the invention provides an ion manipulation device with an electrode geometry that is configured to support variable electric fields, background gases, and pressures. In some implementations, the device includes a novel geometry that includes two (or more) separately controlled regions (e.g., a separation region and a reaction region) and can be interfaced with commercially available ion mobility (IM) quadrupole time-of-flight (IM-QTOF) instrumentation for highly dimensional (N≥5) chemical analyses. Though commercial instrumentation can perform collision-induced dissociation (CID) post-mobility, supporting gas-phase reactions prior to mobility analysis (e.g., IMR, IM) would allow collision cross section information to be collected on the products of the reaction, rather than just the reactants. The proposed instrument configuration facilitates high versatility for analytical analyses, allowing for pre-separation of ions by either mass or mobility in the first region, followed by collision-induced dissociation (CID), electron transfer dissociation (ETD), or ion molecule reactions (IMR) in the second region, and concluding with high-resolution IM-QTOF analyses where additional mass-selected fragmentation (MS/MS) experiments can be conducted.

In some implementations, the invention provides a system including (i) an electrospray ionization (ESI) source, (ii) ion funnels for focusing ions at low pressure, and (iii) tandem segmented quadrupole units. The system is interfaced to a commercial IM-QTOF for high-resolution collision cross section (CCS) and mass-to-charge (m/z) analyses. In some implementations, each unit of the platform is approximately 200 mm in length with an inscribed electrode radius of 4.25 mm consisting of 42 sets of electrodes (sets of 4). In this configuration, the tandem segmented devices will each be capable of operation in multiple modes including quadrupole mass selection, IM selection, trapping for ETD or IMR, and full transmission, which will accommodate CID.

In one embodiment, the invention provides an ion manipulation device including a pair of counter-facing surfaces and a plurality of electrodes arranged in one or more linear array on each of the counter-facing surfaces. At least one RF power source is coupled to the electrodes and configured to apply an RF potential to the electrodes to create an electric field that inhibits charged particles from approaching the counter-facing surfaces. At least one DC power source is coupled to the electrodes and configured to apply a DC potential to affect the movement of ions between the counter-facing surfaces in a direction parallel to the counter-facing surfaces. The DC potential and the RF potential are applied to the electrodes simultaneously.

In some embodiments, the invention further includes control circuitry configured to control the RF potentials and DC potentials applied to the electrodes to cause the ion manipulation device to selectively operate in a plurality of different operating modes. In some embodiments, the invention is configured to separately control electrodes in different regions of the ion manipulation device to simultaneously provide multiple different operating modes at different regions along the length of the ion manipulation device.

Other aspects of the invention will become apparent by consideration of the detailed description and accompanying drawings.

BRIEF DESCRIPTION OF THE DRAWINGS

FIG. 2A is a block diagram of a control system for an ion manipulation device such as the one illustrated in FIG. 1B.

FIG. 2B is a block diagram of the electrical power supply for one set of four electrodes in the ion manipulation device of FIG. 1B.

FIG. 3A is a block diagram of an example of an electrical power supply for the ion manipulation device of FIG. 1B configured to operate with two separate operating regions.

FIG. 3B is a side view of the two-region ion manipulation device of FIG. 3A.

FIG. 11 is a side-view of ion trajectories (flight paths) in the second (e.g., reaction) region of the two-region ion manipulation device of FIG. 3B operating in an electron transfer dissociation (ETD) mode.

FIG. 12 is a side-view of ion positions in the second (e.g., reaction) region of the two-region ion manipulation device of FIG. 3B operating in an ion molecule reactions (IMR) mode.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1A:
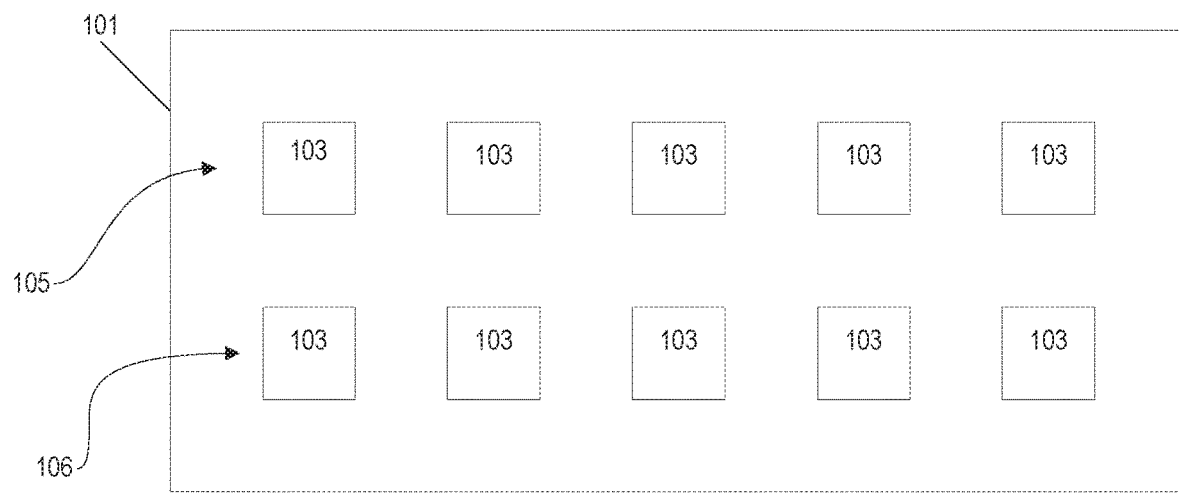
FIG. 1A is an overhead view of one printed circuit board of an ion manipulation device in one embodiment.
Figure 1B:
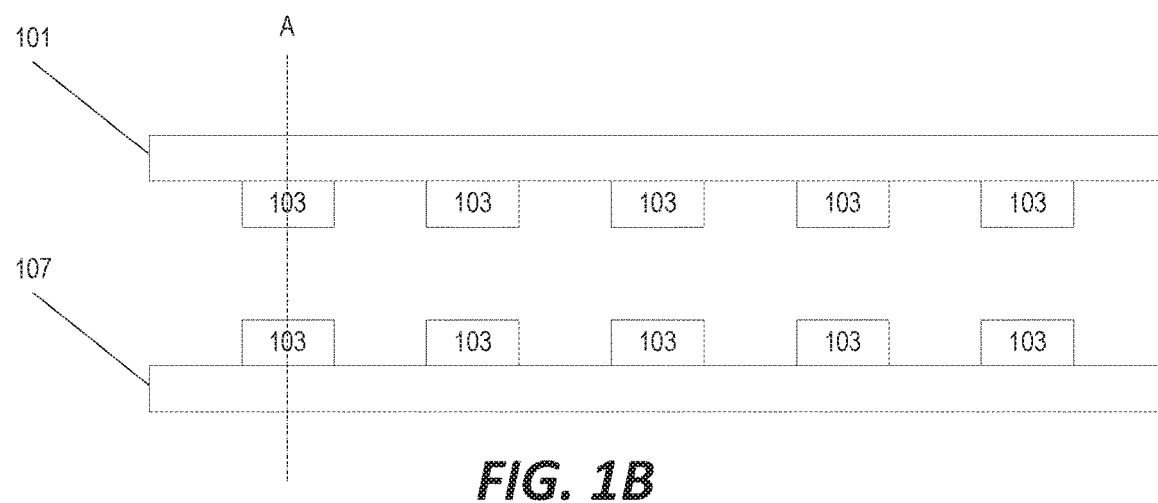
FIG. 1B is a side view of an ion manipulation device including two oppositely facing printed circuit boards similar to the printed circuit board of FIG. 1A.

In some implementations, a variable-mode ion manipulation device includes at least two counter-facing printed circuit boards. FIG. 1A illustrates an example of one of the circuit boards 101 that includes a plurality of individual electrodes 103. The electrodes 103 are arranged on the first printed circuit board 101 in two linear arrays 105, 106. The linear arrays 105, 106 are arranged so that the electrodes 103 are arranged in pairs. A second printed circuit board 107 includes electrodes that are similarly arranged in two linear arrays. As illustrated in FIG. 1B, the first printed circuit board 101 and the second printed circuit board 107 are configured in a counter-facing arrangement with a space provided between the surfaces of the two printed circuit boards 101, 107. Each electrode 103 on the first printed circuit board 101 is positioned across from an electrode 103 on the second printed circuit board 107.

Figure 1C:
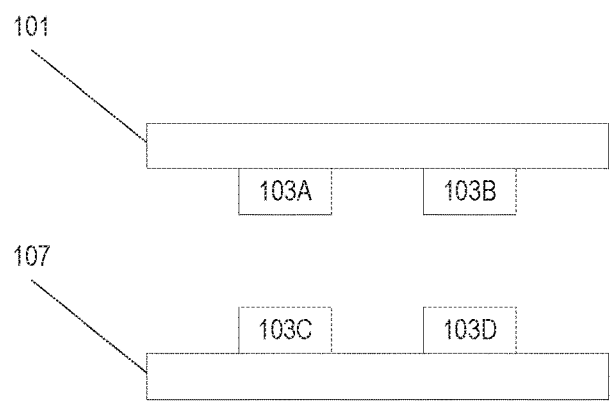
FIG. 1C is a cross-sectional view of the ion manipulation device of FIG. 1B.

FIG. 1C illustrates a cross-section of the ion manipulation device along line A in FIG. 1B. As shown in FIG. 1C, the arrangement of the electrodes 103, the first printed circuit board 101, and the second printed circuit board 107 provides a plurality of electrode groups that each includes four electrodes 103 arranged in the same cross-sectional plane. FIG. 1C illustrates one electrode group that includes an upper left electrode 103A, an upper right electrode 103B, a lower left electrode 103C, and a lower right electrode 103D. The upper left electrode 103A and the upper right electrode 103B are mounted to the first printed circuit board 101 while the lower left electrode 103C and the lower right electrode 103D are mounted to the second printed circuit board 107.

Figure 1D:
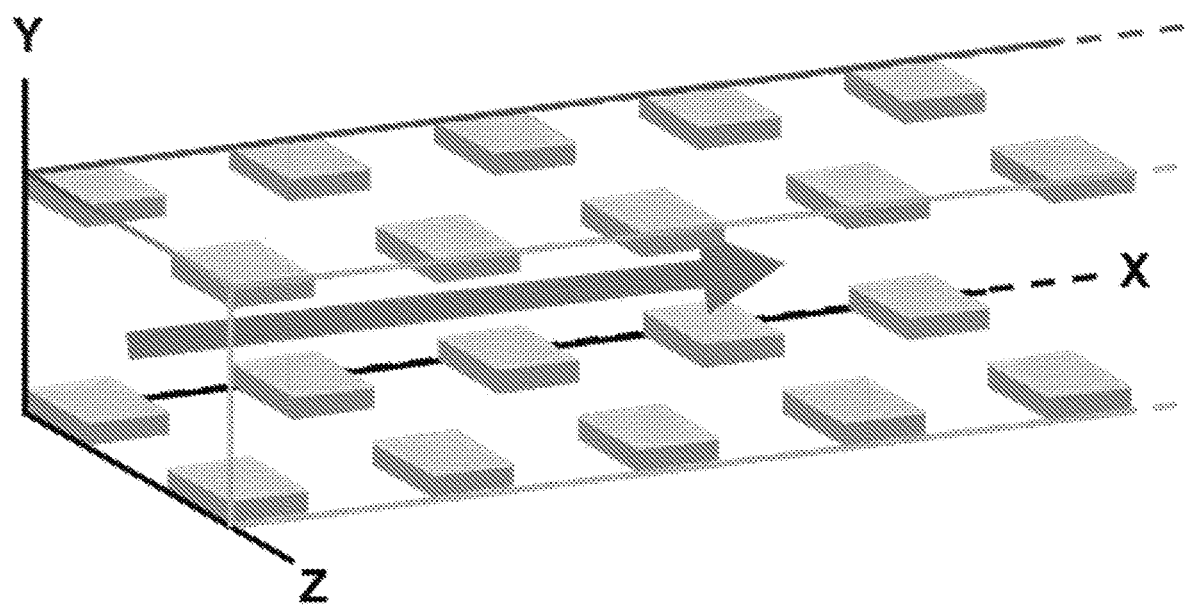
FIG. 1D is a partially transparent perspective view of the ion manipulation device of FIG. 1B showing an example of the direction of ion movement.

FIG. 1D illustrates the ion manipulation device with a plurality of electrode groups—each including four electrodes. Although the example of FIGS. 1A, 1B, and 1D show only five electrode groups (each including four electrodes), in other implementations, the device is configured with more or fewer electrode combinations. For example, in one implementation, the printed circuit boards 101, 107 are each approximately 200 mm in length and include 42 electrode groups. In this example, each electrode is provided as a square electrode surface with a width/length of 4.25 mm. However, in other implementations, the electrodes may be provided with a different shape (e.g., a circle with a 4.25 mm radius) or different size (e.g., smaller or larger than 4.25 mm). Furthermore, in some implementations, the device may include electrodes of various different sizes and/or shapes in the same device (e.g., electrodes that increase or decrease in size to form an electrode size gradient along the length of the printed circuit boards 101, 107).

In the example of FIG. 1D, electric potentials are controllably applied to the electrodes 103 to cause ions to move through the device between the two printed circuit boards 101, 107 as illustrated by the arrow in the direction of the x-axis. As described in further detail below, the electric potentials applied to the electrodes can include, for example, an RF component, a DC component (e.g., a DC offset), and a DC gradient, and can be controllably adjusted/regulated in order to provide a particular operating mode. Furthermore, in some implementations, the system may be configured to alter or adjust the electric potentials applied to the various electrodes in order to selectively operate in multiple different operating modes using the same device and the same electrode configuration.

FIG. 2A illustrates an example of a control system for regulating the electric potentials applied to the electrodes 103 and, in doing so, controlling the operation of the ion manipulation device. The control system includes a controller 201 with a processor 203 and a non-transitory, computer-readable memory 205. In some implementations, the memory 205 stores computer-executable instructions that are accessed and executed by the processor 203 to control the operation of the system (for example, as described herein). Although the example of FIG. 2A shows only one controller 201, one processor 203, and one memory 205, some implementations can include multiple controllers, processors, and/or memory units.

In the example of FIG. 2A, the processor 203 is communicatively coupled to one or more AC/RF generator 207 and to one or more DC generator 209. The controller 201 may be configured to control the operation of the AC/RF generator 207 and/or the DC generator 209 by activating/deactivating the generators and, in some implementations, providing a control signal to the generator defining a variable of the output of the generator including, for example, an RF frequency for the output of the AC/RF generator 207 and an electric potential amplitude for the output of the AC/RF generator 207 and/or the DC generator 209.

In some implementations, the controller 201 is also communicatively coupled to one or more switches 211 and/or variable resistors 213 (e.g., potentiometers) and is configured to operate the switches 211 and variable resistors 213 in order to control and/or vary the electric potential applied to one or more of the electrodes 103. Furthermore, in some implementations, the controller 201 is also communicatively coupled to a user interface which is configured to allow the user to control the device and/or define operating characteristics for the device including, for example, selecting one or more operating modes and defining/adjusting settings relating to the electric potential to be applied to the electrodes 103.

FIG. 2B shows an example of how the electrodes in a single electrode group are coupled to and controlled by the AC/RF generator 207 and the DC generator 209. In this example, the electrodes in each electrode group are paired crosswise so that the upper left electrode 103A is paired with the lower right electrode 103D and the upper right electrode 103B is paired with the lower left electrode 103C. In some implementations, the AC/RF generator 207, the DC generator 209, and the controller 201 are configured to apply an equivalent DC potential across both electrode pairs in a single electrode group (e.g., the same DC potential applied between electrodes 103A and 103D is applied between electrodes 103B and 103C). However, in some implementations, the system is configured to apply RF potentials to the two electrode pairs with similar amplitude and frequency, but with alternate phases. For example, the RF potential applied between a first electrode pair (103A/103D) has the same amplitude and frequency as the RF potential applied between the second electrode pair (103B/103C), but the phase of the RF potential applied to the second electrode pair (103B/103C) is opposite the phase of the RF potential applied to the first electrode pair (103A/103D). In some implementations, the RF potential and the DC potential are applied to the electrodes simultaneously so that the DC potential is effectively a DC offset for the RF potential applied to the same electrode(s).

FIG. 2B illustrates one example of how the AC/RF generator 207 and the DC generator 209 might be coupled to the electrodes in a single electrode group in order to provide the DC and RF potentials to the electrode group as discussed above. A positive output of the AC/RF generator 207 is coupled to the upper left electrode 103A and to the lower right electrode 103D while a negative output of the AC/RF generator 207 is coupled to the upper right electrode 103B and the lower left electrode 103C. In some implementations, the AC/RF generator 207 and/or the controller 201 may be configured to apply the alternate phase RF signals to the crossing electrode pairs simultaneously (e.g., alternate phase RF signals applied to both electrode pairs 103A/103D, 103B/103C at the same time) and/or alternatingly (e.g., so that no RF signal is applied to the first electrode pair 103A/103D while an RF signal is applied to the second electrode pair 103B/103C and vice versa). The outputs of the DC generator 209 are also coupled to each of the four electrodes in the electrode group of FIG. 2B.

In some implementations, a separate RF/AC generator 207 and DC generator 209 may be provided for each individual electrode group. However, in other implementations, a single RF/AC generator 207 and a single DC generator 209 are coupled to multiple different electrode groups. In such implementations, the system may be configured to provide the same RF potential and DC potential to each electrode group and/or include additional circuitry to adjust the potentials applied to each electrode group.

Figure 2C:
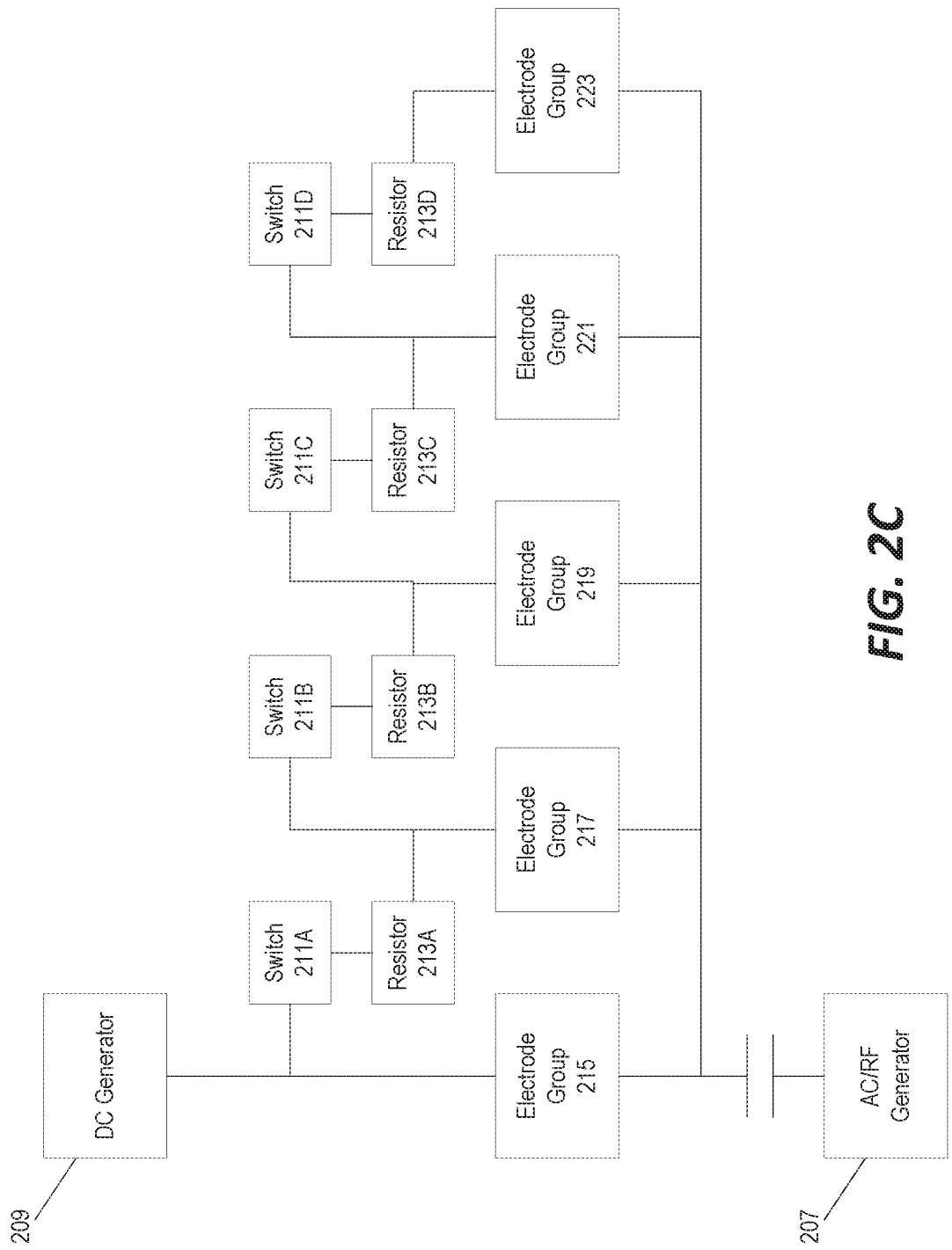
FIG. 2C is a block diagram of one example of an electrical power supply arrangement for the ion manipulation device of FIG. 1B.

FIG. 2C illustrates an example of a system configured to use the same RF/AC generator 207 and DC generator 209 for multiple electrode groups and additional circuitry to vary the potentials applied to one or more of the electrode groups. In the example of FIG. 2C, an AC/RF generator 207 is coupled directly to five different electrode groups 215, 217, 219, 221, 223. As discussed above, each electrode group in the example of FIG. 2C includes four electrodes and the four electrodes in each electrode group are paired crosswise to provide two electrode pairs in each electrode group. The system of FIG. 2C also includes a single DC generator 209 that is coupled to each electrode group. However, the system of FIG. 2C also includes a switch and a resistor coupled in parallel between each electrode group relative to the DC generator 209.

For example, as in FIG. 2C, a first switch 211A and a first resistor 213A are coupled in parallel between the node at which the DC generator 209 is coupled to the first electrode group 215 and a node at which the DC generator 209 is coupled to the second electrode group 217. A second switch 211B and a second resistor 213B are coupled in parallel between the node at which the DC generator 209 is coupled to the second electrode group 217 and the node at which the DC generator 209 is coupled to the third electrode group 219. Similarly, a third switch 211C and a third resistor 213C are provided relative to the fourth electrode group 221 and a fourth switch 211D and a fourth resistor 213D are provided relative to the fifth electrode group 223.

In this configuration, when all of the switches 211A, 211B, 211C, 211D are closed, the same DC potential is applied by the DC generator 209 to each of the electrode groups 215, 217, 219, 221, 223. However, when all of the switches are open, the current from the DC generator 209 must run through each of the resistors 213A, 213B, 213C, 213D before reaching each respective electrode group 217, 219, 221, 223. Each successive resistor causes the DC potential applied to the electrode group to decrease. Accordingly, in the arrangement of FIG. 2C, a DC gradient is applied to the electrode groups along the length of the device. Furthermore, in some implementations, the resistors 213A, 213B, 213C, 213D can be provided as variable resistors (e.g., electrically-controlled potentiometers) so that the controller 201 may be configured to adjust the resistance of each resistor and, thereby, control/adjust the degree to which the DC potential changes along the DC gradient.

FIG. 2C provides just one example of circuit configurations that can be used to adjust the electric potential that is applied to each electrode group while using a common AC/RF generator 207 and a common DC generator 209 for multiple electrode groups. Other implementations may include other switching configurations for adjusting/regulating DC potentials in addition to or instead of the configuration illustrated in the example of FIG. 2C. Similarly, in some implementations, additional circuitry can be implemented to adjust, control, and vary the RF potential applied to the different electrode groups. For example, in some implementations, the system is further configured to selectively disable (or significantly limit) a DC and/or RF/AC potential applied to a particular electrode group in order to provide a traveling wave electric potential scheme as discussed in further detail below.

Furthermore, the diagrams of FIGS. 2A, 2B, and 2C are provided as block diagrams to illustrate various functional components that can be included in implementing the functionality of the devices described herein and are not intended as comprehensive circuit diagrams. For example, the device may include various summing node components to combine the DC potential and RF potential applied to each electrode group (and/or electrode pair in each group) to combine the DC and RF potentials applied while preventing the RF potential from altering the operation of the DC circuit and vice versa.

The example of FIG. 2C provides a configuration in which a single DC generator 209 and a single AC/RF generator 207 are used to control the electric potential applied to five electrode groups 215, 217, 219, 221, 223. However, as discussed above, other implementations may include more or fewer electrode groups.

The electric potentials applied to each individual electrode group in the example of FIG. 2C can be controlled to provide a single operating mode as discussed in further detail below. However, in other implementations, the system can be configured to provide multiple different regions each configured to separately provide a different, selectable operating mode. FIG. 3A illustrates one example of a system in which the electrode groups are controlled to provide separate operating regions. The system of FIG. 3A includes a first DC generator 301 and a first AC/RF generator 303 coupled to a first series of electrode groups 305, 307, 309, 311. The system of FIG. 3A also includes a second DC generator 313 and a second AC/RF generator 315 coupled to a second series of electrode groups 317, 319, 321, 323. In this example, both DC generators 301, 313 and both AC/RF generators 303, 315 are separately controlled to provide different combinations of RF and DC potentials on their respective electrode groups. For example, a first DC/RF potential scheme can be applied to electrode groups 305, 307, 309, 311 while a second, different DC/RF potential scheme is applied to electrode groups 317, 319, 321, 323.

As shown in FIG. 3B, the individual electrodes are mounted to two counter-facing printed circuit boards 331, 333 similar to the configuration illustrated in FIG. 1B. The top electrodes 305B, 307B, 309B, 311B, 317B, 319B, 321B, and 323B in each electrode group are all mounted to the same top circuit board 331 in a linear array while the bottom electrodes 305D, 307D, 309D, 311D, 317D, 319D. 321D, and 323D in each electrode group are all mounted to the same bottom circuit board 333 in a linear array. Furthermore, although only the top right electrodes and the bottom right electrodes are visible in FIG. 3B, the top left electrodes and bottom left electrodes are similarly mounted to the top circuit board 331 and the bottom circuit board 333, respectively, in similar linear electrode arrays.

Although the electrodes are all mounted to the same top circuit board 331 and bottom circuit board 333, they are configured to be controlled separately to effectively form two separate operating regions in the device—a first region 335 and a second region 337. As described in further detail below, the system may be configured to separately control the electric potentials applied to the electrodes in each separate region to provide separate operating modes in each region as the ions pass through the device.

Again, although the example of FIGS. 3A and 3B shows only four electrode groups in each operating region, other implementations may include more or fewer electrode groups. For example, a device may be configured to include 42 electrode groups with 21 electrode groups configured to operate as part of a first operating region while the other 21 electrode groups are configured to operate as part of the second operating region. In still other implementations, the number of electrode groups in each operating region is not necessarily the same—for example, the first 25 electrode groups might be operated as part of the first operating region while the remaining 17 electrode groups are operated as part of the second operating region. Furthermore, the system in some implementations may be configured to selectively vary the number of electrode groups in each operating region based, for example, on a user input or a selected operating mode.

Also, although the example of FIG. 3A illustrates a first DC generator 301 and a first AC/RF generator 303 controlling the electric potentials applied to electrodes in the first operating region while a second DC generator 313 and a second AC/RF generator 315 controls the electric potentials applied to electrodes in the second operating region, some implementations are configured to utilize more or fewer generators. For example, in some implementations, a single DC generator 301 and a single AC/RF generator 303 are used to provide the electric potential for all electrode groups in both operating regions while additional circuitry is used to adjust/control the specific DC/RF potentials applied to each particular electrode group. Alternatively, multiple different AC/RF generators and/or DC generators can be used to control the electric potential applied to different electrode or electrode groups within a single operating region.

The examples described above provide a device including a plurality of electrode groups arranged on counter-facing printed circuit boards and configured to selectively control an electric potential applied to each electrode. By selectively controlling various characteristics applied to the electrodes (and the electrode groups) including, for example, a DC potential, an RF potential, a DC gradient, and an RF frequency, the system is able to operate in a plurality of different operating modes using the same electrode platform and control system.

Figure 4:
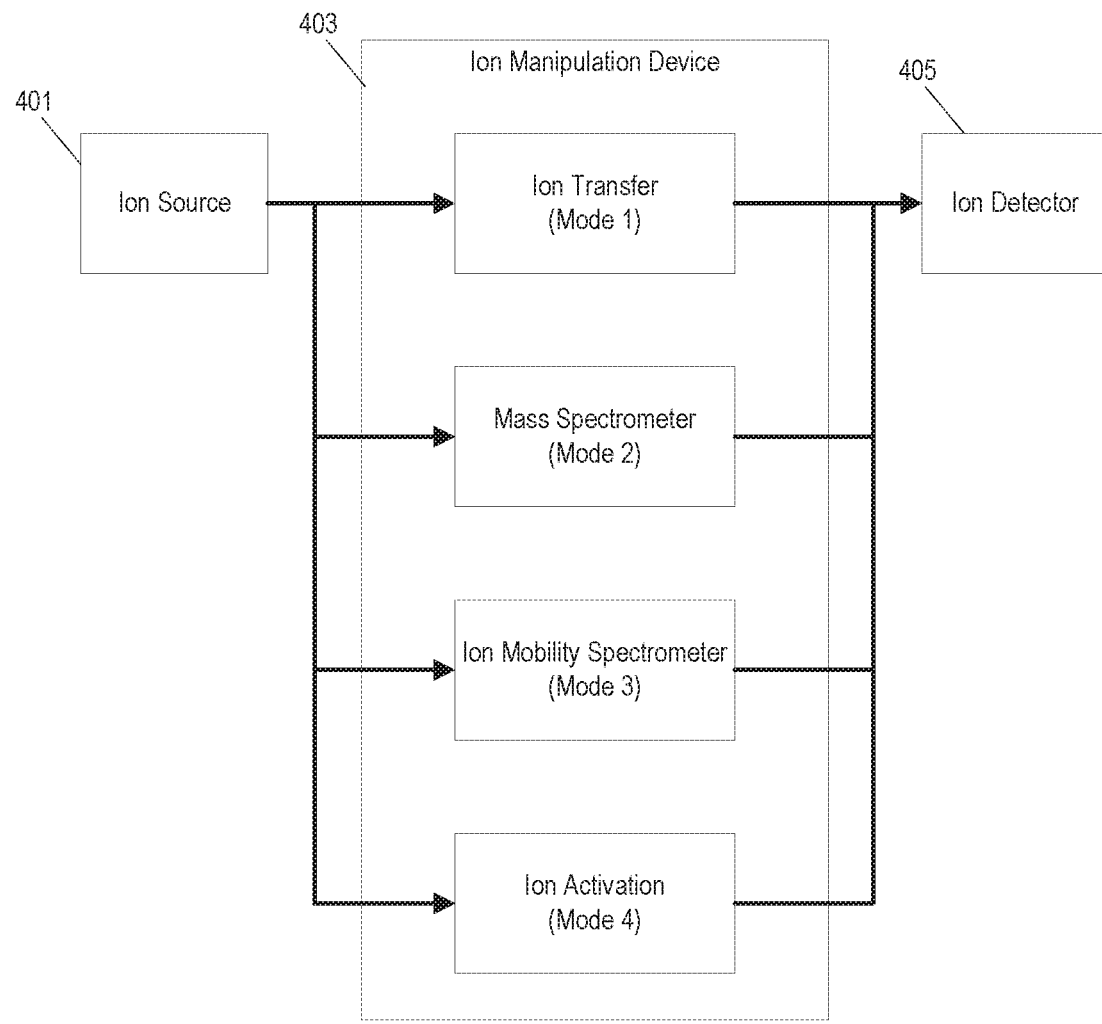
FIG. 4 is a functional block diagram of different operating modes that can be applied in the single-region ion manipulation device of FIG. 1B.

FIG. 4 illustrates one example of a method for operating a system including the ion manipulation device to provide a single operating region (e.g., the device of FIG. 1B). Ions from an ion source 401 (e.g., an electrospray ion source) enter the ion manipulation device 403 at a first end. After passing through the ion manipulation device 403, some or all of the ions exit the ion manipulation device 403 into an ion detector 405 (e.g., a mass spectrometer). The ion manipulation device 403 itself, however, can be operated to selectively perform a number of different operations including, for example, ion transfer (mode 1), mass spectrometer (mode 2), ion mobility spectrometer (mode 3), and ion activation (mode 4). Although only four separate functional "modes" are illustrated in the example of FIG. 4, the device can be configured to provide more, fewer, or different operating modes by varying parameters such as, for example, RF frequency, RF amplitude, DC amplitude, DC gradient, device pressure, background gas, and operating temperature.

Figure 5:
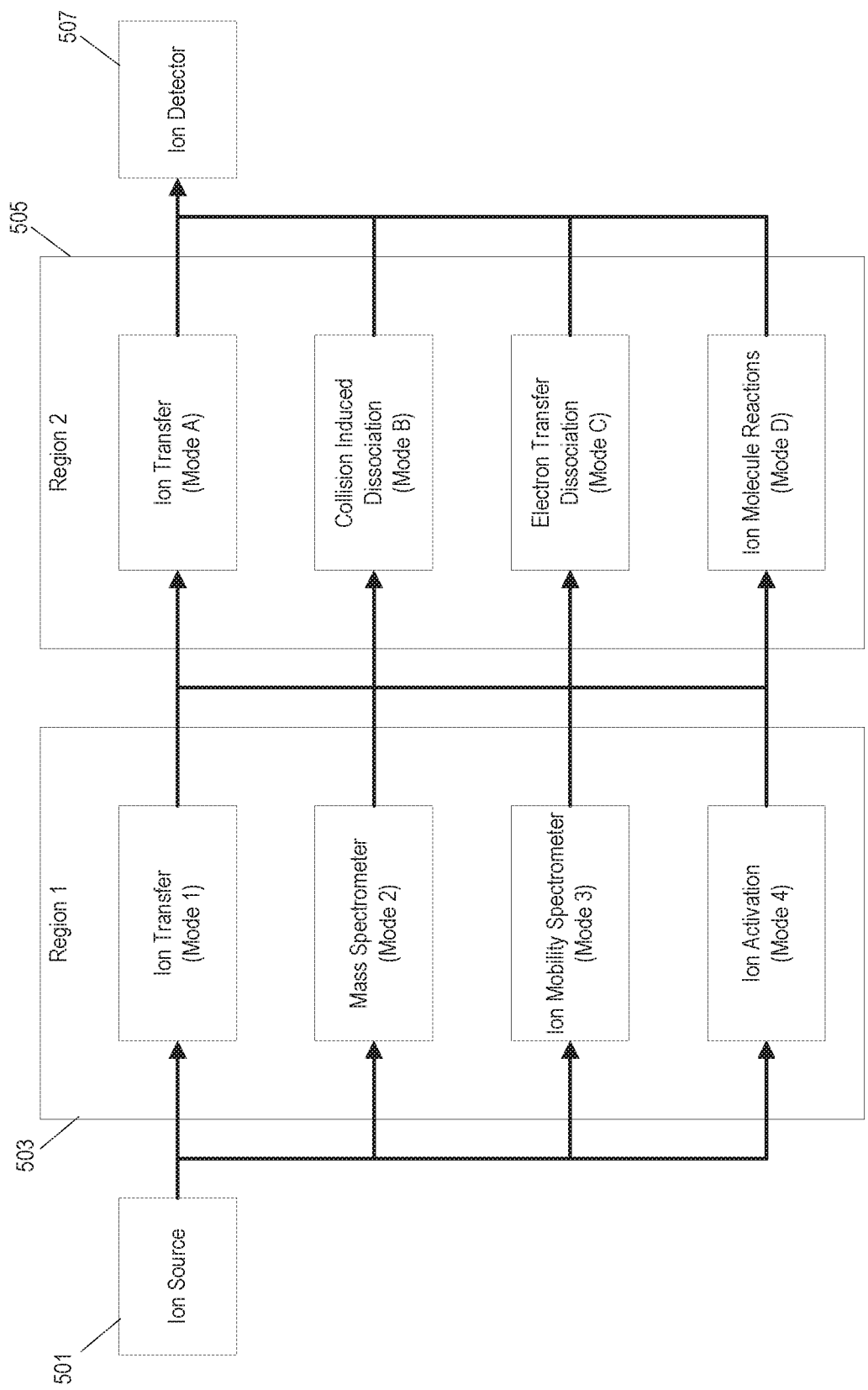
FIG. 5 is a functional block diagram of different operating modes that can be applied in the two-region ion manipulation device of FIG. 3B.

Although the example of FIG. 4 discusses only a single operation that can be performed by the manipulation device 403 at any particular time, as discussed above, in some implementations, the ion manipulation device can be operated to concurrently provide two separate operating regions by separately controlling the operating parameters for the separate areas of the device. FIG. 5 illustrates an example of a system in which the device is operated to provide two separate operating regions along the ion path. In the example of FIG. 5, ions from an ion source 501 enter one end of the ion manipulation device. In particular, the ions first pass through the first region 503 of the ion manipulation device before exiting the first region 503 and entering the second region 505. Ions ultimately exit the second region 505 and enter an ion detector 507.

As described above, the first region 503 and the second region 505 can be controlled to separately provide various different functional operations in each region. For example, in some implementations, the first region 503 is operated as a separation region while the second region 505 is operated as a reaction region for the ions after "separation." In the example of FIG. 5, the first region 503 can be selectively operated to provide any one of the same four modes described above in reference to FIG. 4 (e.g., ion transfer (mode 1), mass spectrometer (mode 2), ion mobility spectrometer (mode 3), and ion activation (mode 4). Furthermore, the second region 505 is configured to be operated to selectively provide one of four different operating modes: ion transfer (mode A), collision induced dissociation (CID) (mode B), electron transfer dissociation (ETD) (mode C), and ion molecule reactions (IMR) (mode D)). These modes are described in further detail below.

Accordingly, the system of FIG. 5 can be selectively operated to provide up to 16 different operating combinations by selectively controlling the operating mode for the first region and the operating mode for the second region. Furthermore, even though the two-region device illustrated above (e.g., FIGS. 3A and 3B) are described as operating the first region and the second region separately, in some implementations, the system may be configured to selectively operate the two-region device as a single operating region by controlling the operating parameters of the first region 503 and the second region 505 to perform a single operating mode across the entire length of the device.

Figure 6:
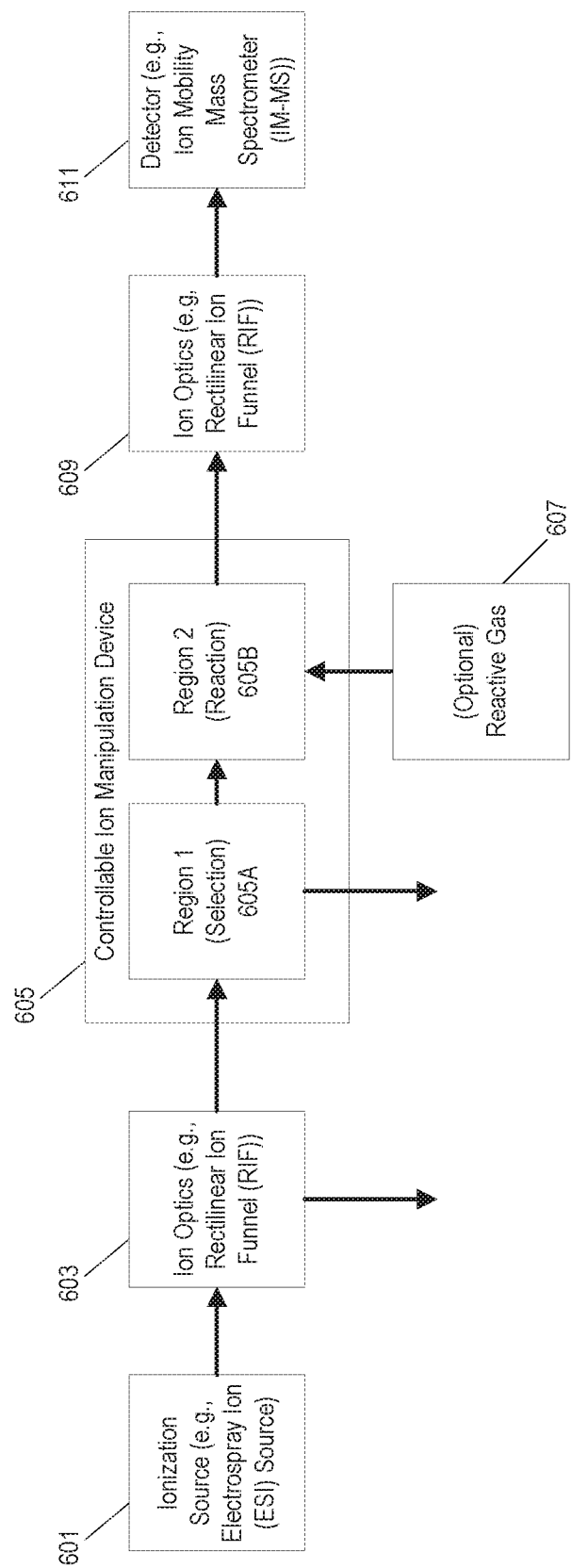
FIG. 6 is a functional block diagram of an ion-mobility mass spectrometry (IM-MS) system including the two-region ion manipulation device of FIG. 3B.

FIG. 6 illustrates an example of a system including the controllable ion manipulation device with two operation regions. The system includes an electrospray ionization (ESI) source 601 configured to inject ions into a first rectilinear ion funnel (RIF) 603. The first RIF 603 provides a narrowed beam of ions that then enter the controllable ion manipulation device 605. As discussed above, the controllable ion manipulation device 605 in this example is operated to provide two separate operating regions: a selection region 605A followed by a reaction region 605B. In some implementations, the device may be configured to pump a gas (reactive or inert) 607 into the controllable ion manipulation device 605. Similarly, in some implementations, the system may be configured to pump/remove some ions and/or neutral molecules from the system at the first RIF 603 or at the controllable ion manipulation device 605 (as indicated by the output arrows in FIG. 6). In some implementations, ions that pass through the entire length of the controllable ion manipulation device 605 then pass through a second rectilinear ion funnel (RIF) 609 before entering an ion mobility mass spectrometer (IM-MS) 611 (e.g., for high resolution IM-QTOF analysis). Alternatively, in some implementations, the system could be configured to send ions to other instrument configurations (e.g., IMS, MS, etc.) or a Faraday detector to terminate ions immediately after the second region of the ion manipulation device.

The examples presented above described four examples of operating modes for the device of FIG. 1B that includes a single operating region. These same four modes can be utilized in the first region (e.g., the selection region) of a two-region device (e.g., as illustrated in FIGS. 3A and 3B).

In mode 1, the device is operated as an ion transfer device where a broad distribution of ions are transmitted from the ion source 401 to the ion detector 405. This can be achieved, for example, by applying an RF potential to the electrodes with an RF frequency of 1.0525 MHz and a peak-to-ground RF amplitude of 0 to 1 kV. At the same time, a DC voltage (e.g., a DC offset) ranging from 0 to 1 kV is also applied to the electrodes. In some implementations, while operating as an ion transfer device, pressure within the device is maintained at approximately 1 Torr with nitrogen as the background gas and with a temperature ranging from 22° C. to 27° C.

In mode 2, the device is operated as a mass spectrometer by use of appropriate RF and DC potentials so that ions of a specified mass are allowed to pass through the device to the ion detector while all other ion masses are rejected. In some implementations, the device is operated as a mass spectrometer by applying an RF potential with an RF frequency of 1.0525 MHz and a peak-to-ground RF amplitude of 0 to 5 kV. At the same time, a DC voltage (e.g., a DC offset) ranging from 0 to 2 kV is also applied to the electrodes. In some implementations, the pressure within the device is maintained at 0.001 Torr with nitrogen as the background gas while operating the device as a mass spectrometer. Again, in some implementations, the temperature is maintained between 22° C. and 27° C. while operating the device as a mass spectrometer.

Figure 7A:
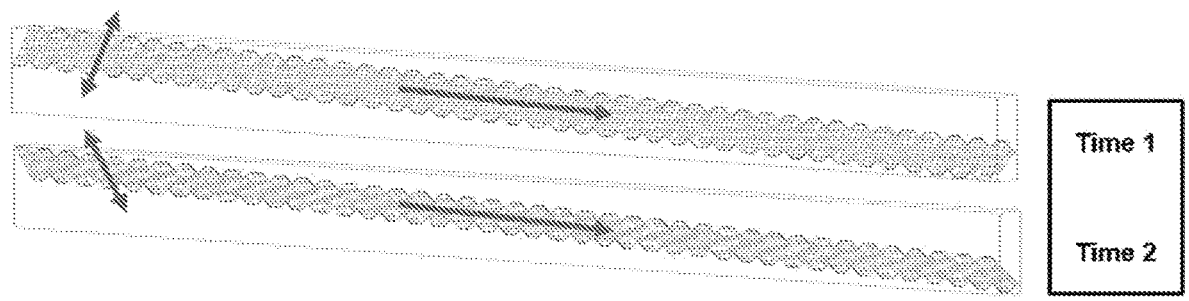
FIG. 7A is a graph of the DC voltages and RF switching applied to the electrodes of the ion manipulation device of FIG. 1B or FIG. 3B operating in a quadrupole mass spectrometer mode.
Figure 7B:
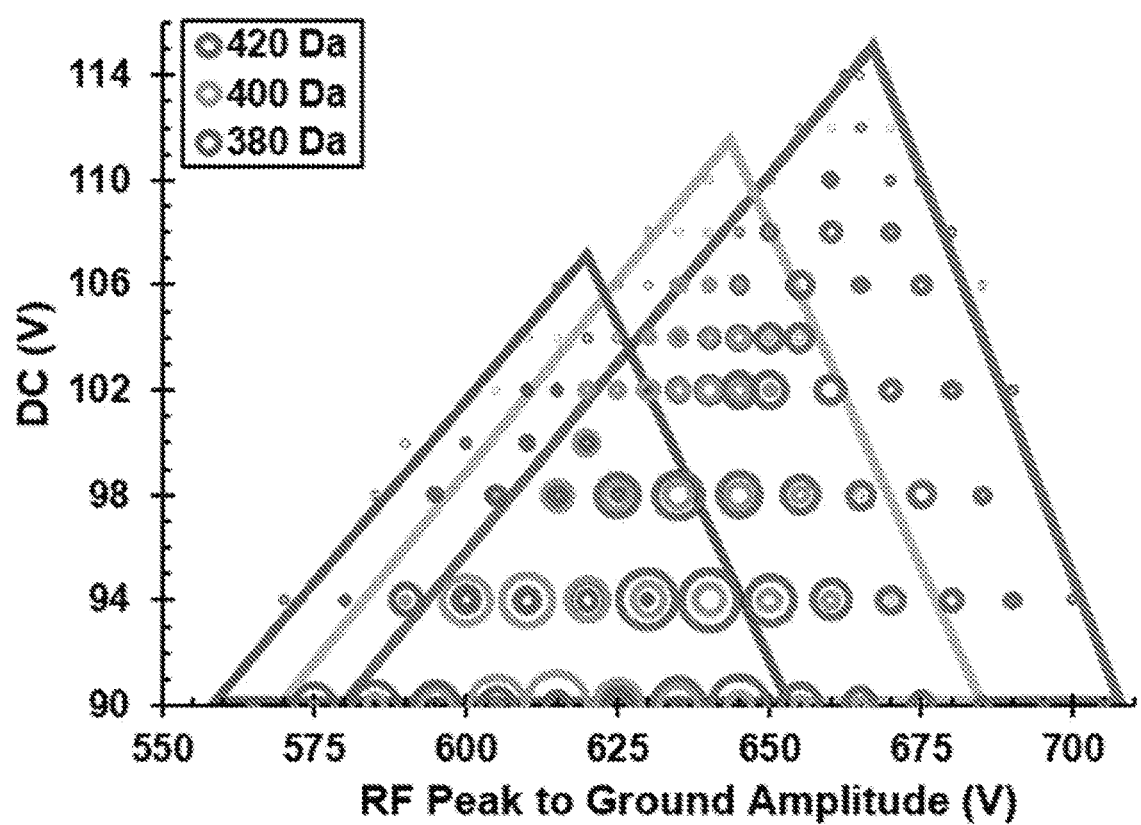
FIG. 7B is a graph of relative transmission of ions of different masses under various combinations of RF and DC stimulus applied to the electrodes of the ion manipulation device operating in the quadrupole MS mode of FIG. 7A.
Figure 7C:
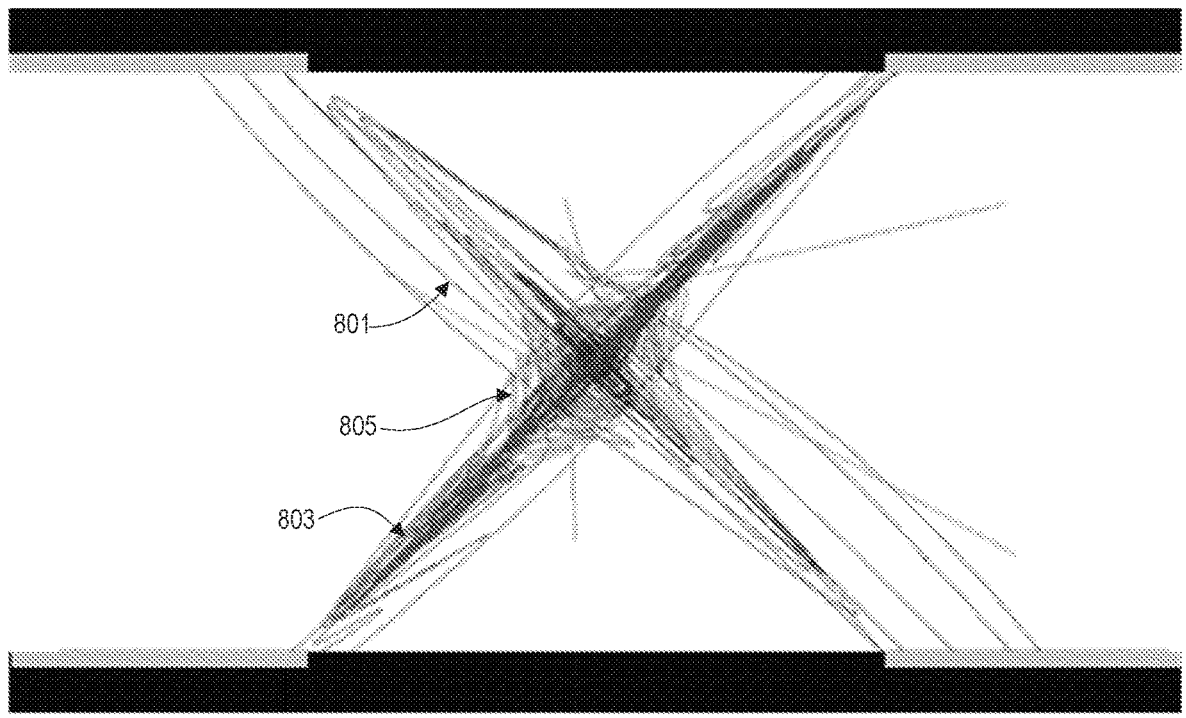
FIG. 7C is a cross-sectional view of ion positions in the ion manipulation device operating in the quadrupole MS mode of FIG. 7A.

Mode 2 operation as a mass spectrometer can be achieved, for example, by controlling the applied potentials to cause the device to act as a quadrupole as illustrated in FIGS. 7A, 7B, 7C, and 7D. When the device (or the first region of the device) is operated as a quadrupole mass filter, the ion trajectories are mass-dependent. FIG. 7C shows a cross-section of the device/region operating as a quadrupole mass spectrometer. Lower mass ions (e.g., approximately 380 Da) are filtered out in one dimension 801 by an applied RF field and higher mass ions (e.g., approximately 420 Da) are rejected by the DC bias in an orthogonal dimension 803. The ions of the target mass (e.g., approximately 400 Da) travel through the device and remain near the center 805. The DC bias is shown in the potential energy diagrams of FIG. 7A by the leftmost arrow in the first graph (Time 1) and the RF switching is illustrated with the reversing of that arrow in the lower potential energy diagram (Time 2). The long arrows to the right represent the DC gradient applied across the device to improve transmission. This DC gradient feature is inaccessible in conventional quadrupole rods.

FIG. 7B illustrates the relative transmission of ions of different masses at various combinations of DC potential and RF potentials. Ions of approximately 380 Da mass will pass through the device at DC/RF combinations in area (i) of FIG. 7B, ions of approximately 400 Da mass will pass through the device at DC/RF combinations in area (ii) of FIG. 7B, and ions of approximately 420 Da mass will pass through the device at DC/RF combinations in area (iii) in FIG. 7B. Accordingly, the filtering mechanism of the device can be adjusted to selectively transmit particular masses while rejecting other masses by selecting a combination of DC and RF potentials that is unique for the target ion mass.

Figure 7D:
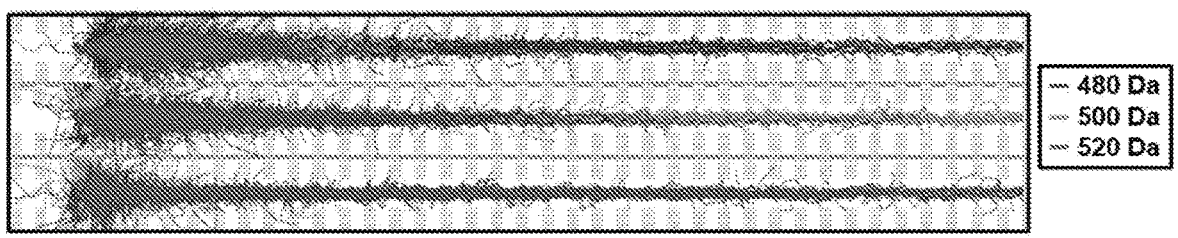
FIG. 7D is a side-view of ion trajectories (flight paths) in the ion manipulation device operating in the quadrupole MS mode of FIG. 7A under three different RF/DC combinations.

FIG. 7D illustrates three examples of ion transmission (from a side view of the device) at three different combinations of DC and RF potentials. In the first example, the DC and RF potentials are selected and applied to transmit ions of a 480 Da mass while rejecting/filtering ions of a 500 Da mass and ions of a 520 Da mass. In the second example, the DC and RF potentials are selected and applied to transmit ions of a 500 Da mass while rejecting/filtering ions of a 480 Da mass and ions of a 520 Da mass. Finally, in the third example, the DC and RF potentials are selected and applied to transmit ions of a 520 Da mass while rejecting/filtering ions of a 480 Da mass and ions of a 500 Da mass.

Returning now to the examples of FIG. 4 and FIG. 5, in mode 3, the device is operated as an ion mobility spectrometer by use of appropriate RF and DC potentials so that ions of a specified mobility are allowed to pass to the ion detector. The ions of the specified mobility are separated in either space or time from other ions possessing different mobilities. In some implementations, the device is operated as an ion mobility spectrometer by applying an RF potential with an RF frequency of 2.8 MHz and a peak-to-ground RF amplitude of 125 V. At the same time, DC voltages are applied to the electrodes, for example, as a travelling wave with an amplitude of 40V. In some implementations, the pressure within the device is maintained at 0.1 Torr to 20 Torr with nitrogen as the background gas while operating the device as an ion mobility spectrometer. Again, in some implementations, the temperature is maintained between 22° C. and 27° C. while operating the device as an ion mobility spectrometer.

Figure 8A:
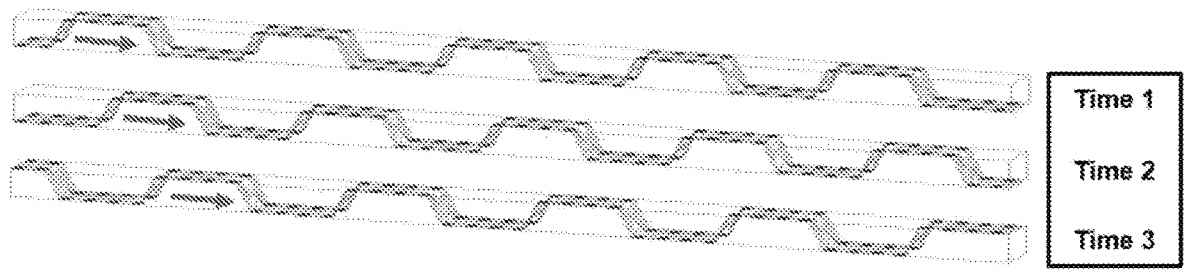
FIG. 8A is a graph of the DC voltages applied to the electrodes of the ion manipulation device of FIG. 1B or FIG. 3B operating in a travelling wave ion manipulation mode.
Figure 8B:
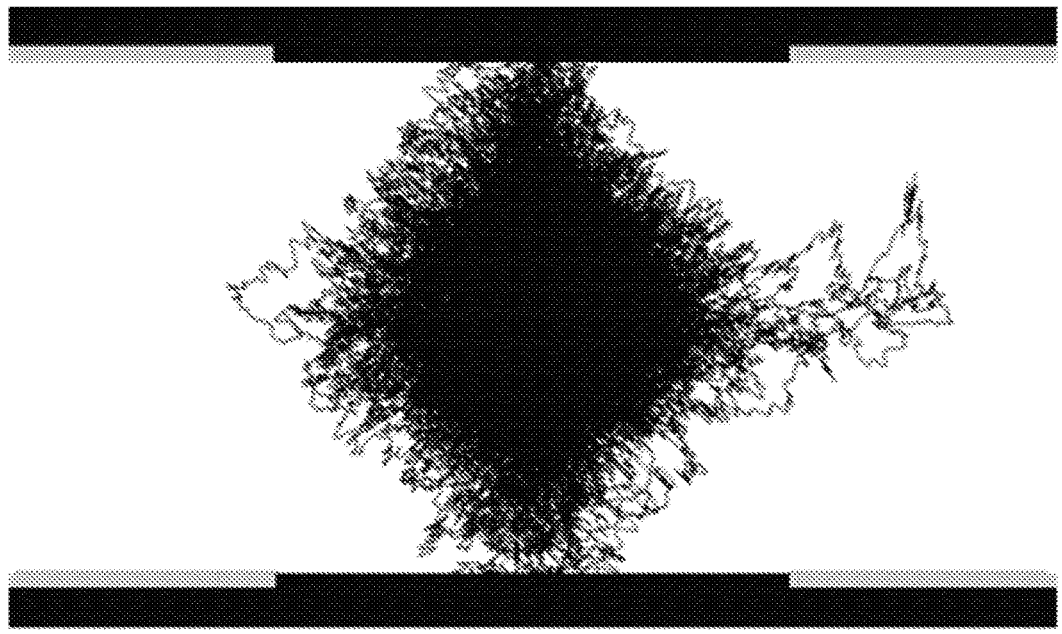
FIG. 8B is a cross-sectional view of ion trajectories (flight paths) in the ion manipulation device operating in the travelling wave ion manipulation mode of FIG. 8A.
Figure 8C:
FIG. 8C is side view of ion positions in the ion manipulation device operating in the travelling wave ion mobility mode of FIG. 8A.

FIGS. 8A, 8B, and 8C illustrate one example in which the device or a region of the device is operated as an ion mobility spectrometer using a travelling wave. FIG. 8A is a potential energy diagram showing the DC voltage applied to the electrodes along the length of the device/region at three different times (e.g., three sequential phases). In the first phase, electrodes are held at higher DC voltage in sections of four adjacent electrode groups. In the next phase, the high DC voltage is shifted along the main axis by two electrode groups, and so on, creating a potential energy wave that propels ions through the device. FIG. 8B shows a cross-sectional view of the ion trajectories as viewed down the main axis of the device/region. The electric field generated by the four PCB pads in each electrode group cause the ions to occupy a diamond shaped area. FIG. 8C shows the ion trajectories along the device/region from a side view perspective. The trajectories illustrated in FIG. 8C show a periodic focusing that is noticeable due to the traveling wave and confining RF being low magnitude to increase dwell time and improve separation.

Returning again to FIG. 4 and FIG. 5, in mode 4, the device is operated as an ion activation device where ions are energetically-activated to unfold or break apart into fragments by use of the appropriate RF and DC fields or by use of trapped ions or electrons. Various combinations of RF and DC potentials, pressures, background gases, and temperatures may be used while operating the device as an ion activation device including, for example, the parameters described below in reference to modes B, C, and D.

FIG. 5 includes examples of four specific operating modes that can be implemented by controlling and adjusting operating parameters of the second region: ion transfer (mode A), collision induced dissociation (CID) (mode B), electron transfer dissociation (ETD) (mode C), and ion molecule reactions (IMR) (mode D)).

Figure 9:
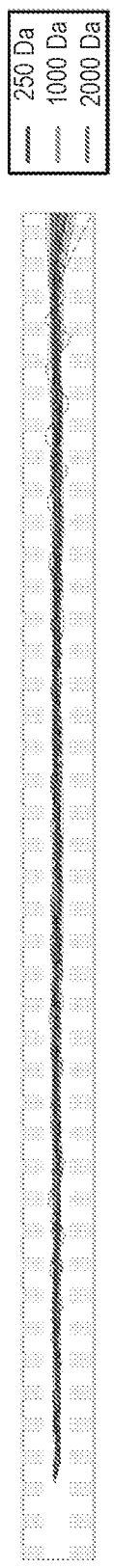
FIG. 9 is a side-view of ion trajectories (flight paths) in the second (e.g, reaction) region of the two-region ion manipulation device of FIG. 3B operating in an ion transfer mode.

In Mode A, the second region of the device is operated similarly to the ion transfer mode (mode 1) of the first operating region to cause a broad distribution of ion masses to be transmitted from the first region to the ion detector. An RF potential is applied with an RF frequency of 1.0525 MHz and a peak-to-ground RF amplitude of 0 to 1 kV. A DC voltage ranging from 0 to 1 kV is also applied to the electrodes. The pressure is approximately 1 Torr and nitrogen is used as the background gas. When the second region is operated in a transfer mode, the RF and DC voltages are held relatively low to allow transmission of a wide range of masses. FIG. 9 shows ion positions in the second region from a side-view perspective while the second region is being operated in an ion transfer mode (mode A). As illustrated in FIG. 9, the trajectories show full transmission of ions ranging from 250 Da mass to 2000 Da mass simultaneously.

Figure 10:
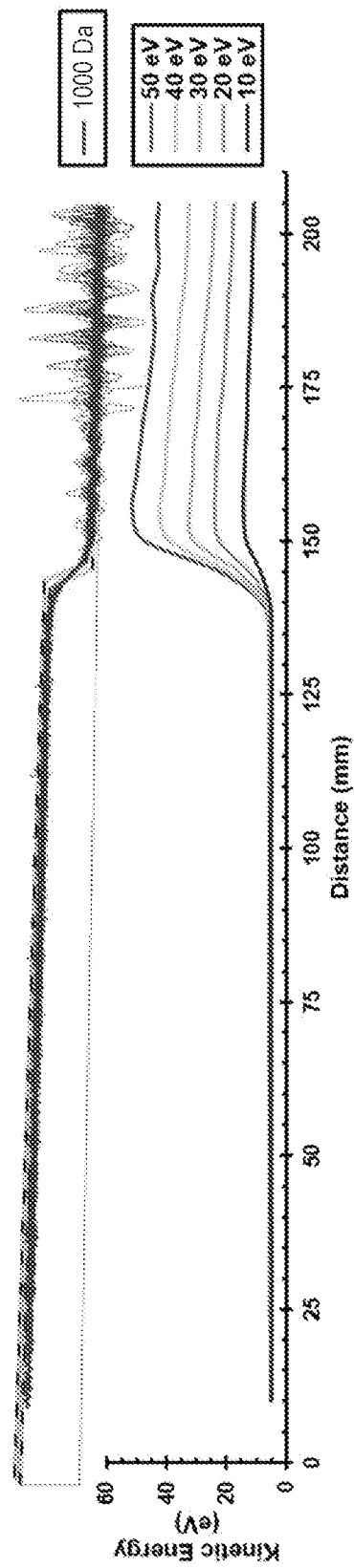
FIG. 10 is a potential energy surface view of a side-view of ion trajectories (flight paths) and a graph of kinetic energy in the second (e.g., reaction) region of the two-region ion manipulation device of FIG. 3B operating in a collision induced dissociation (CID) mode.

In Mode B, the second region is operated as a collision induced dissociation (CID) device where ions are energetically-activated to unfold or break apart into fragments by use of the appropriate RF and DC fields and collisions with a neutral background gas. An RF potential is applied with an RF frequency of 1.0525 MHz and a peak-to-ground RF amplitude of 400V. The DC voltage is applied ranging from 0 to 1 kV. An inert background gas such as, for example, nitrogen is used and the pressure in the device is maintained at a level between 1 Torr and 100 Torr. To perform collision induced dissociation (CID), a DC drop is imposed about % of the way through the device to give ions higher kinetic energy. The graphs in FIG. 10, with distance on the x axis and kinetic energy on the y axis, shows how the magnitude of this voltage change directly affects the kinetic energy of the ions, enabling effective collisions with the background gas.

In Mode C, the second region is operated as an electron transfer dissociation (ETD) device where ions are energetically-activated to unfold or break apart into fragments by use of appropriate RF and DC fields and/or by use of trapped ions or electrons. An RF potential is applied with an RF frequency of 1.0525 MHz and a peak-to-ground RF amplitude of 400V along the device. However, a peak-to-ground RF amplitude of 1000 kV is applied at the electrode groups at the entrance and exit of the second region. The DC voltage is maintained at 0 V. The DC voltage is applied ranging from 0 to 1 kV. An inert background gas such as, for example, nitrogen is used and the pressure in the device is maintained at approximately 0.001 Torr. When the device is operated for electron transfer dissociation (ETD), the entrance and exit electrodes are held high, effectively trapping positive and negative ions for milliseconds or more. This allows time for transfer of electrons. FIG. 11 illustrates ion positions from a side view along the length of the second region as it is operated as an ETD device.

In Mode D, the second region is operated as an ion molecule reaction (IMR) device where ions undergo chemical reactions by use of appropriate RF and DC fields and/or interaction with a reactive background gas. An RF potential is applied with an RF frequency of 1.0525 MHz and a peak-to-ground RF amplitude of 400V along the device. However, a peak-to-ground RF amplitude of 1000 kV is applied at the electrode groups at the entrance and exit of the second region. The DC voltage is maintained at 0 V. The DC voltage is applied ranging from 0 to 1 kV. The pressure in the device is maintained at approximately 0.001 Torr and a reactive background gas such as, for example, ozone is provided to the device. For IMR, the first and last electrode groups are held at high potential energy, preventing ions from exiting the device. A wide range of masses can be trapped for milliseconds or more to allow time for ions to react with the background gas. FIG. 12 illustrates ion positions from a side view along the length of the second region as it is operated as an IMR device.

The examples described above include only a few specific examples of operations that can be performed by a controllably ion manipulation device as discussed above. In some implementations, other parameter combinations are used to cause the device to perform other operations. Also, although the examples above only describe implementations that include one or two operating regions, other implementations may be configured to include more that two separately controlled operating regions that each are selectively controlled to perform a particular operation.

Thus, the invention provides, among other things, a system and method for selectively performing a plurality of different ion mobility operations, individually or concurrently, using a device with a single electrode geometry and configuration. Various features and advantages of the invention are set forth in the following claims.

What is claimed is:

1. An ion manipulation device comprising:
 a pair of counter-facing surfaces;
 a plurality of electrodes arranged in one or more linear array on each of the counter-facing surfaces,
  wherein the plurality of electrodes arranged in the one or more linear array on each of the counter-facing surfaces includes electrodes arranged in four linear arrays, wherein two linear arrays are arranged on each of the counter-facing surface, and wherein the four linear arrays are arranged parallel to each other in the direction parallel to the counter-facing surfaces, and wherein the plurality of electrodes in the four linear arrays are arranged to position groups of four electrodes in each of a plurality of cross-sectional planes, wherein each group of four electrodes include one electrode from each linear array of the four linear arrays;

at least one RF power source coupled to the electrodes of the plurality of electrodes and configured to apply RF potentials to the electrodes to create an electric field that inhibits charged particles from approaching the counter-facing surfaces;

at least one DC power source coupled to the electrodes of the plurality of electrodes and configured to apply DC potentials to the electrodes to affect movement of ions between the counter-facing surfaces in a direction parallel to the counter-facing surfaces, wherein the DC potentials and the RF potentials are applied to the electrodes simultaneously; and control circuitry configured to control RF potentials and DC potentials applied to each group of four electrodes to cause the ion manipulation device to selectively operate in a plurality of different operating modes, wherein the plurality of different operating modes includes an ion transfer mode where the applied RF potential and DC potential cause all ions to move between the counter-facing surfaces in the direction parallel to the counter-facing surfaces, wherein the control circuitry is configured to operate the ion manipulation device in the ion transfer mode by applying the RF potential to the electrodes with a peak-to-ground amplitude between −1 kV and 1 kV and with an RF frequency of 1.0525 MHz, applying the DC potential to the electrodes by applying a DC bias to each group of four electrodes between −1 kV and 1 kV, and applying a DC gradient of between 0 V/cm to 100 V/cm from a front group of four electrodes and a back group of four electrodes in the four linear arrays.

2. The ion manipulation device of claim 1, wherein the at least one RF power source is configured to apply an RF potential across electrodes that are paired crosswise in each group of four electrodes, wherein each group of four electrodes includes a top-left electrode, a top-right electrode, a bottom-left electrode, and a bottom-right electrode in a cross-sectional plane, and wherein the top-left electrode is paired with the bottom-right electrode and the top-right electrode is paired with the bottom-left electrode.

3. The ion manipulation device of claim 2, wherein the at least one RF power source is configured to apply the RF potential to the electrodes by applying a first RF potential to a first pair of electrodes in a group of electrodes and applying a second RF potential to a second pair of electrodes in the group of electrodes, wherein the second RF potential has the same amplitude as the first RF potential, the same frequency as the first RF potential, and a phase that is opposite in phase to the first RF potential.

4. The ion manipulation device of claim 3, wherein the at least one DC power source is configured to apply a DC potential to the electrodes by applying a DC bias to both pairs of electrodes in each group of four electrodes.

5. The ion manipulation device of claim 2, wherein the at least one DC power source is configured to apply a DC potential across the electrodes that are paired crosswise in each group of four electrodes.

6. The ion manipulation device of claim 2, wherein the at least one DC power source is configured to apply the DC potentials across the electrodes by applying a DC gradient to the plurality of electrodes by applying a successively lower DC potential to each group of four electrodes along a length of the counter-facing surfaces.

7. The ion manipulation device of claim 1, wherein the plurality of different operating modes further includes a mass spectrometer mode where the applied RF potential and DC potential cause only ions of a particular mass to pass through the ion manipulation device in the direction parallel to the counter-facing surfaces, an ion mobility spectrometer mode where the applied RF potential and DC potential cause ions of a specified mobility to pass through the ion manipulation device in the direction parallel to the counter-facing surfaces separated in space or time from ions of other mobilities, and an ion activation mode where the applied RF potential and DC potential energetically activate ions to unfold or break apart into fragments.

8. An The ion manipulation device comprising:

a pair of counter-facing surfaces;

a plurality of electrodes arranged in one or more linear array on each of the counter-facing surfaces, wherein the plurality of electrodes arranged in the one or more linear array on each of the counter-facing surfaces includes electrodes arranged in four linear arrays, wherein two linear arrays are arranged on each of the counter-facing surface, and wherein the four linear arrays are arranged parallel to each other in the direction parallel to the counter-facing surfaces, and wherein the plurality of electrodes in the four linear arrays are arranged to position groups of four electrodes in each of a plurality of cross-sectional planes, wherein each group of four electrodes include one electrode from each linear array of the four linear arrays;

at least one RF power source coupled to the electrodes of the plurality of electrodes and configured to apply RF potentials to the electrodes to create an electric field that inhibits charged particles from approaching the counter-facing surfaces;

at least one DC power source coupled to the electrodes of the plurality of electrodes and configured to apply DC potentials to the electrodes to affect movement of ions between the counter-facing surfaces in a direction parallel to the counter-facing surfaces, wherein the DC potentials and the RF potentials are applied to the electrodes simultaneously; and control circuitry configured to control RF potentials and DC potentials applied to each group of four electrodes to cause the ion manipulation device to selectively operate in a plurality of different operating modes, wherein the plurality of different operating modes includes a mass spectrometer mode where the applied RF potential and DC potential cause only ions of a particular mass to pass through the ion manipulation device in the direction parallel to the counter-facing surfaces, wherein the control circuitry is configured to operate the ion manipulation device in the mass spectrometer mode by applying the RF potential to the electrodes with a peak-to-ground amplitude between −5 kV and 5 kV and with an RF frequency of 1.0525 MHz, applying the DC potential to the electrodes by applying a DC bias to each group of four electrodes between −2 kV and 2 kV, and applying a DC gradient of between 0 V/cm to 100 V/cm from a front group of four electrodes and a back group of four electrodes in the four linear arrays.

9. An The ion manipulation device comprising:

a pair of counter-facing surfaces;

a plurality of electrodes arranged in one or more linear array on each of the counter-facing surfaces,
 wherein the plurality of electrodes arranged in the one or more linear array on each of the counter-facing surfaces includes electrodes arranged in four linear arrays, wherein two linear arrays are arranged on each of the counter-facing surface, and wherein the four linear arrays are arranged parallel to each other in the direction parallel to the counter-facing surfaces, and
 wherein the plurality of electrodes in the four linear arrays are arranged to position groups of four electrodes in each of a plurality of cross-sectional planes, wherein each group of four electrodes include one electrode from each linear array of the four linear arrays;

at least one RF power source coupled to the electrodes of the plurality of electrodes and configured to apply RF potentials to the electrodes to create an electric field that inhibits charged particles from approaching the counter-facing surfaces;

at least one DC power source coupled to the electrodes of the plurality of electrodes and configured to apply DC potentials to the electrodes to affect movement of ions between the counter-facing surfaces in a direction parallel to the counter-facing surfaces,
 wherein the DC potentials and the RF potentials are applied to the electrodes simultaneously; and control circuitry configured to control RF potentials and DC potentials applied to each group of four electrodes to cause the ion manipulation device to selectively operate in a plurality of different operating modes, wherein the plurality of different operating modes includes an ion mobility spectrometer mode where the applied RF potential and DC potential cause ions of a specified mobility to pass through the ion manipulation device in the direction parallel to the counter-facing surfaces separated in space or time from ions of other mobilities, wherein the control circuitry is configured to operate the ion manipulation device in the ion mobility spectrometer mode by
 applying the RF potential to the electrodes with a peak-to-ground amplitude between −5 kV and 5 kV and with an RF frequency of 1.0525 MHz,
 applying the DC potential to the electrodes by applying a DC bias to each group of four electrodes between −2 kV and 2 kV, and
 applying a DC gradient of between 0 V/cm to 100 V/cm from a front group of four electrodes and a back group of four electrodes in the four linear arrays.

10. The ion manipulation device of claim 9, wherein the control circuitry is further configured to operate the ion manipulation device in the ion mobility spectrometer mode by applying a travelling wave of DC potentials to the electrodes,
 wherein the control circuitry is configured to apply the travelling wave of DC potentials by applying a high DC potential and a low DC potential to alternating sets of groups of four electrodes along a length of the ion manipulation device and iteratively shifting the sets of groups of electrodes to which the high DC potential and the low DC potential are applied along the length of the ion manipulation device in a direction of ion movement.

11. The ion manipulation device of claim 10, wherein the control circuit is configured to apply the high DC potential and the low DC potential to alternating sets including at least four groups of four electrodes in each set, and wherein the control circuit is configured to iteratively shift the sets by shifting the sets by at least two groups of four electrodes so that at least two groups of four electrodes in each set that received the high DC potential in a previous iteration receive the low DC potential in the subsequent iteration.

12. The ion manipulation device of claim 1, wherein the plurality of different operating modes further includes
 a collision induced dissociation (CID) mode,
 an electron transfer dissociation (ETD) mode, and
 an ion molecule reaction (IMR) mode.

13. The ion manipulation device of claim 1, wherein the control circuitry is configured to operate the ion manipulation device in at least one operating mode of the plurality of different operating modes by
 applying a high DC potential to a first group of four electrodes from the four linear arrays,
 applying the high DC potential to a last group of four electrodes from the four linear arrays, and
 applying a lower DC potential to a plurality of groups of electrodes from the four linear arrays between the first group of four electrodes and the last group of four electrodes,
 wherein the high DC potential applied to the first group of four electrodes and the last group of four electrodes inhibit movement of ions from inside the ion manipulation device to outside the ion manipulation device.

14. An ion manipulation device comprising:

a pair of counter-facing surfaces;

a plurality of electrodes arranged in one or more linear array on each of the counter-facing surfaces,
 wherein the plurality of electrodes arranged in the one or more linear array on each of the counter-facing surfaces includes electrodes arranged in four linear arrays, wherein two linear arrays are arranged on each of the counter-facing surface, and wherein the four linear arrays are arranged parallel to each other in the direction parallel to the counter-facing surfaces, and
 wherein the plurality of electrodes in the four linear arrays are arranged to position groups of four electrodes in each of a plurality of cross-sectional planes, wherein each group of four electrodes include one electrode from each linear array of the four linear arrays;

at least one RF power source coupled to the electrodes of the plurality of electrodes and configured to apply RF potentials to the electrodes to create an electric field that inhibits charged particles from approaching the counter-facing surfaces;

at least one DC power source coupled to the electrodes of the plurality of electrodes and configured to apply DC potentials to the electrodes to affect movement of ions between the counter-facing surfaces in a direction parallel to the counter-facing surfaces p2 wherein the DC potentials and the RF potentials are applied to the electrodes simultaneously; and control circuitry configured to control RF potentials and DC potentials applied to each group of four electrodes to cause the ion manipulation device to selectively operate in a plurality of different operating modes,
wherein the control circuitry is configured to operate the ion manipulation device in at least one operating mode of the plurality of different operating modes by
applying a high DC potential to a first group of four electrodes from the four linear arrays,
applying the high DC potential to a last group of four electrodes from the four linear arrays, and
applying a lower DC potential to a plurality of groups of electrodes from the four linear arrays between the first group of four electrodes and the last group of four electrodes,
wherein the high DC potential applied to the first group of four electrodes and the last group of four electrodes inhibit movement of ions from inside the ion manipulation device to outside the ion manipulation device,
wherein the at least one operating mode includes an electron transfer dissociation (ETD) mode,
wherein, when operating in the electron transfer dissociation (ETD) mode, a neutral background gas is provided between the counter-facing surfaces,
wherein, when operating in the electron transfer dissociation (ETD) mode, electrons are transferred between the ions and other ions or electrons within the ion manipulation device, and
wherein the high DC potential applied to the first group of four electrodes and the last group of four electrodes traps the ions within the ion manipulation device to allow more time for the transfer of electrons.

15. An ion manipulation device comprising:
a pair of counter-facing surfaces;
a plurality of electrodes arranged in one or more linear array on each of the counter-facing surfaces,
wherein the plurality of electrodes arranged in the one or more linear array on each of the counter-facing surfaces includes electrodes arranged in four linear arrays, wherein two linear arrays are arranged on each of the counter-facing surface, and wherein the four linear arrays are arranged parallel to each other in the direction parallel to the counter-facing surfaces, and
wherein the plurality of electrodes in the four linear arrays are arranged to position groups of four electrodes in each of a plurality of cross-sectional planes, wherein each group of four electrodes include one electrode from each linear array of the four linear arrays;
at least one RF power source coupled to the electrodes of the plurality of electrodes and configured to apply RF potentials to the electrodes to create an electric field that inhibits charged particles from approaching the counter-facing surfaces;
at least one DC power source coupled to the electrodes of the plurality of electrodes and configured to apply DC potentials to the electrodes to affect movement of ions between the counter-facing surfaces in a direction parallel to the counter-facing surfaces
wherein the DC potentials and the RF potentials are applied to the electrodes simultaneously; and
control circuitry configured to control RF potentials and DC potentials applied to each group of four electrodes to cause the ion manipulation device to selectively operate in a plurality of different operating modes,
wherein the control circuitry is configured to operate the ion manipulation device in at least one operating mode of the plurality of different operating modes by
applying a high DC potential to a first group of four electrodes from the four linear arrays,
applying the high DC potential to a last group of four electrodes from the four linear arrays, and
applying a lower DC potential to a plurality of groups of electrodes from the four linear arrays between the first group of four electrodes and the last group of four electrodes,
wherein the high DC potential applied to the first group of four electrodes and the last group of four electrodes inhibit movement of ions from inside the ion manipulation device to outside the ion manipulation device,
wherein the at least one operating mode includes an ion molecules reaction (IMR) mode,
wherein, when operating in the ion molecules reaction (IMR) mode, a reactive gas is provided between the counter-facing surfaces,
wherein, when operating in the ion molecules reaction (IMR) mode, the ions undergo chemical reactions, and
wherein the high DC potential applied to the first group of four electrodes and the last group of four electrodes traps the ions within the ion manipulation device to allow more time for the chemical reactions.

16. An The ion manipulation device comprising:
a pair of counter-facing surfaces;
a plurality of electrodes arranged in one or more linear array on each of the counter-facing surfaces,
wherein the plurality of electrodes arranged in the one or more linear array on each of the counter-facing surfaces includes electrodes arranged in four linear arrays, wherein two linear arrays are arranged on each of the counter-facing surface, and wherein the four linear arrays are arranged parallel to each other in the direction parallel to the counter-facing surfaces, and
wherein the plurality of electrodes in the four linear arrays are arranged to position groups of four electrodes in each of a plurality of cross-sectional planes, wherein each group of four electrodes include one electrode from each linear array of the four linear arrays;
at least one RF power source coupled to the electrodes of the plurality of electrodes and configured to apply RF potentials to the electrodes to create an electric field that inhibits charged particles from approaching the counter-facing surfaces;
at least one DC power source coupled to the electrodes of the plurality of electrodes and configured to apply DC potentials to the electrodes to affect movement of ions between the counter-facing surfaces in a direction parallel to the counter-facing surfaces.
wherein the DC potentials and the RF potentials are applied to the electrodes simultaneously; and
control circuitry configured to control RF potentials and DC potentials applied to each group of four electrodes to cause the ion manipulation device to selectively operate in a plurality of different operating modes,
wherein the plurality of different operating modes includes a collision induced dissociation (CID) mode,
wherein the control circuitry is configured to operating the ion manipulation device in the collision induced dissociation (CID) mode by applying a high DC potential to a first plurality of groups of four electrodes adjacently positioned beginning at a front end of the four linear arrays, and applying a low DC potential to a second plurality of groups of four electrodes adjacently positioned between an end of the first plurality of groups of electrodes and a back end of the four linear arrays, wherein a drop in DC potential from the first plurality of groups to the second plurality of groups increases kinetic energy of the ions and enables effective collisions between the ions and a background gas.

17. The ion manipulation device of claim 1 further comprising control circuitry configured to control the RF potential and DC potential applied to the electrodes to cause the ion manipulation device to simultaneously operate in at least two different operating modes, wherein the control circuitry is configured to operate in a first operating mode in a first region between the counter-facing surfaces by controlling the RF potentials and DC potentials applied to electrodes in the first region according to a first set of control parameters, and wherein the control circuitry is configured to operate in a second operating mode in a second region between the counter-facing surfaces by controlling the RF potentials and the DC potentials applied to electrodes in the second region according to a second set of control parameters.

18. The ion manipulation device of claim 17, wherein the control circuitry is configured to cause the ion manipulation device to selectively operate in a first plurality of different operating modes in the first region and to selectively operating in a second plurality of different operating modes in the second region.

19. The ion manipulation device of claim 1, further comprising control circuitry configured to control the RF potential and DC potential applied to the electrodes, wherein the control circuitry includes at least one electronic controller, a plurality of electronically-controlled switches, and a plurality of variable resistors.

20. The ion manipulation device of claim 8, wherein the plurality of different operating modes further includes an ion transfer mode where the applied RF potentials and DC potentials cause a broad distribution of ions to move between the counter-facing surfaces in the direction parallel to the counter-facing surfaces, an ion mobility spectrometer mode where the applied RF potential and DC potential cause ions of a specified mobility to pass through the ion manipulation device in the direction parallel to the counter-facing surfaces separated in space or time from ions of other mobilities, and an ion activation mode where the applied RF potential and DC potential energetically activate ions to unfold or break apart into fragments.

21. The ion manipulation device of claim 9, wherein the plurality of different operating modes further includes an ion transfer mode where the applied RF potentials and DC potentials cause a broad distribution of ions to move between the counter-facing surfaces in the direction parallel to the counter-facing surfaces, a mass spectrometer mode where the applied RF potential and DC potential cause only ions of a particular mass to pass through the ion manipulation device in the direction parallel to the counter-facing surfaces, and an ion activation mode where the applied RF potential and DC potential energetically activate ions to unfold or break apart into fragments.

\* \* \* \* \*